United States Patent [19]

Klensch

[11] 4,146,890
[45] Mar. 27, 1979

[54] RANGE RATE MEASUREMENT

[75] Inventor: Richard J. Klensch, Lawrenceville, N.J.

[73] Assignee: RCA Corporation, New York, N.Y.

[21] Appl. No.: 873,861

[22] Filed: Jan. 31, 1978

[30] Foreign Application Priority Data

Jan. 31, 1977 [GB] United Kingdom ............... 03916/77

[51] Int. Cl.² .............................................. G01S 9/44
[52] U.S. Cl. ......................................... 343/8; 343/14
[58] Field of Search ...................................... 343/8, 14

[56] References Cited

U.S. PATENT DOCUMENTS

| 2,711,529 | 6/1955 | Shanahan | 343/14 |
| 2,928,085 | 3/1960 | Katz | 343/14 |
| 3,249,938 | 5/1966 | Blitz et al. | 343/14 |
| 3,362,024 | 1/1968 | Badewitz | 343/14 |
| 3,761,946 | 9/1973 | Johannessen et al. | 343/14 |
| 3,968,492 | 7/1976 | Kaplan | 343/14 |

Primary Examiner—Maynard R. Wilbur
Assistant Examiner—Lawrence Goodwin
Attorney, Agent, or Firm—H. Christoffersen; Joseph D. Lazar; Raymond E. Smiley

[57] ABSTRACT

A continuous wave frequency modulated signal is radiated from a range rate measuring system and returned by a target, the range rate of which, relative to the measuring system, is to be determined. The radiated signal and return signal are mixed to produce a beat frequency signal which is converted to a square wave signal marking passage of the beat frequency signal above and below its average value. A detector produces signals indicative of the presence and absence of transitions of the square wave signal at the turnaround points of the modulation waveform. The range rate of the target is directly related to the rate of the presence and absence of such signals.

5 Claims, 2 Drawing Figures

RANGE RATE MEASUREMENT

BACKGROUND OF THE INVENTION

A known method of measuring range and range rate of a target consists of providing apparatus for producing a continuous wave carrier frequency modulated by a repeatable waveform such as a triangle, a sawtooth, a sine wave, or the like which signal is radiated to the target of interest. The signal is returned from the target to the apparatus and mixed with the transmitted signal to produce a beat frequency.

For a triangular waveform, the beat frequency $f_B$ is given by the formula:

$$f_B = \frac{8\Delta F f_m R}{c} \pm \frac{2f_o \dot{R}}{c} \quad (1)$$

The symbols in formula (1) have the following meaning and in one exemplary embodiment the following values:
$\Delta F$ = modulation frequency deviation = 25 MHz;
$f_m = 1/T$ = modulation rate = 3 KHz;
R = range of target from the apparatus = 0 to 100 meters;
$f_0$ = carrier frequency = 10.575 GHz;
$\dot{R}$ = range rate or velocity of target = 0–76.5 kilometers/hour;
c = speed of light.

The plus sign in formula (1) is associated with the modulation upsweep and the minus sign with modulation downsweep. By rearranging formula (1) both range and range rate of a target may be determined as follows:

$$R = \frac{c f_B \text{avg}}{8\Delta F f_m} \quad (2)$$

Where $f_B$ avg is the measured beat frequency as averaged over upsweep and downsweep of the modulation cycle.
Likewise:

$$\dot{R} = \frac{f_d c}{2f_o} \quad (3)$$

Where $f_d = f_B$ avg - formula (1) using only the plus sign.

In theory formula (3) may be used to determine range rate directly. In practice, however, given the parameters of the exemplary system, the determination of the frequencies involved in formula (3) is difficult. Another method to determine range rate is to determine range by formula 2 and then differentiate with respect to time, i.e., $$\dot{R} \cong \frac{dR}{dt} = \frac{\Delta R}{\Delta t} \quad (4)$$

From formula (2) it will be noted that a determination of R requires a determination of average beat frequency. One method of determining beat frequency is to count the number, N, cycles of the beat frequency over one modulation cycle and multiply by $f_m$. As N can only be an integer the determined frequency will only be in multiples of $f_m$. Thus the determined range will only be in multiples of $f_m$. For parameters of the exemplary system, the computed range will be in increments of 1.5 meters which is known as range granularity. Such granularity will also appear in the range rate measurement of formula 4 and is not acceptable in some applications.

Further, at each turnaround point of the modulation waveform such as at the junction of an unsweep and a downsweep portion of a triangular waveform, the beat frequency is indeterminant. In the case of a triangular waveform, the beat frequency is symmetrical about each turnaround point. Additionally, if the target has any velocity component relative to the measuring apparatus the symmetrical beat frequency will cross or not cross its average value at successive turnaround points at a rate dependent on the velocity of the target. D. G. C. Luck, "Frequency Modulated Radar" McGraw-Hill, Inc., New York, 1949) in FIG. IV-II (h), pg. 106 shows that the indicated beat note frequency, as determined by counting its cycles, changes by one for each $\lambda/4$ of target motion, where $\lambda$ is the wavelength of the carrier frequency, $f_0$, for a unit with the exemplary parameters and with $f_0 = 10.575$ GHz $\lambda/4 = 0.71$ centimeters. Thus for each movement of the target of approximately 0.71 centimeters the beat frequency determined by counting beat frequency cycles changes by one, alternately increasing and decreasing. This change in the number of cycles is manifested as crossing and non-crossing of the beat frequency about its average value at the modulation turnaround points as mentioned above.

The range may also be determined by determining the time to complete one cycle of beat frequency which will be as accurate as the clock used to determine the time. However, to determine range and therefore range rate which sufficient accuracy in some applications, requires a clock with such precision as to make it prohibitively expensive. Thus formula (4) does not provide satisfactory determination of range rate given the exemplary parameters of interest.

A second method of determining range rate involves utilizing a waveform which is continuous wave frequency modulated interspersed with a waveform which is not modulated. The nonmodulated waveform is used to determine range rate in a known manner. Generation of such a dual waveform requires relatively complex and costly equipment.

SUMMARY OF THE INVENTION

In accordance with the invention, apparatus for determining the range rate of a target relative to the apparatus includes means for producing and radiating a continuous wave frequency modulated (FMCW) signal to a target and receiving the returned signal from the target, the range rate of which is to be determined. The radiated and returned signals are mixed to produce a beat frequency. A concurrence means produces a pulse indicative of each concurrent presence of a turnaround of the FMCW signal and a crossing of the beat frequency about a preselected value thereof. A means is responsive to the concurrence means pulses for producing a signal corresponding to the rate, as a function of time, of the presence and absence of a crossing at the turnaround points.

DETAILED DESCRIPTION OF THE PREFERRED EMBODIMENT

Figure 1:
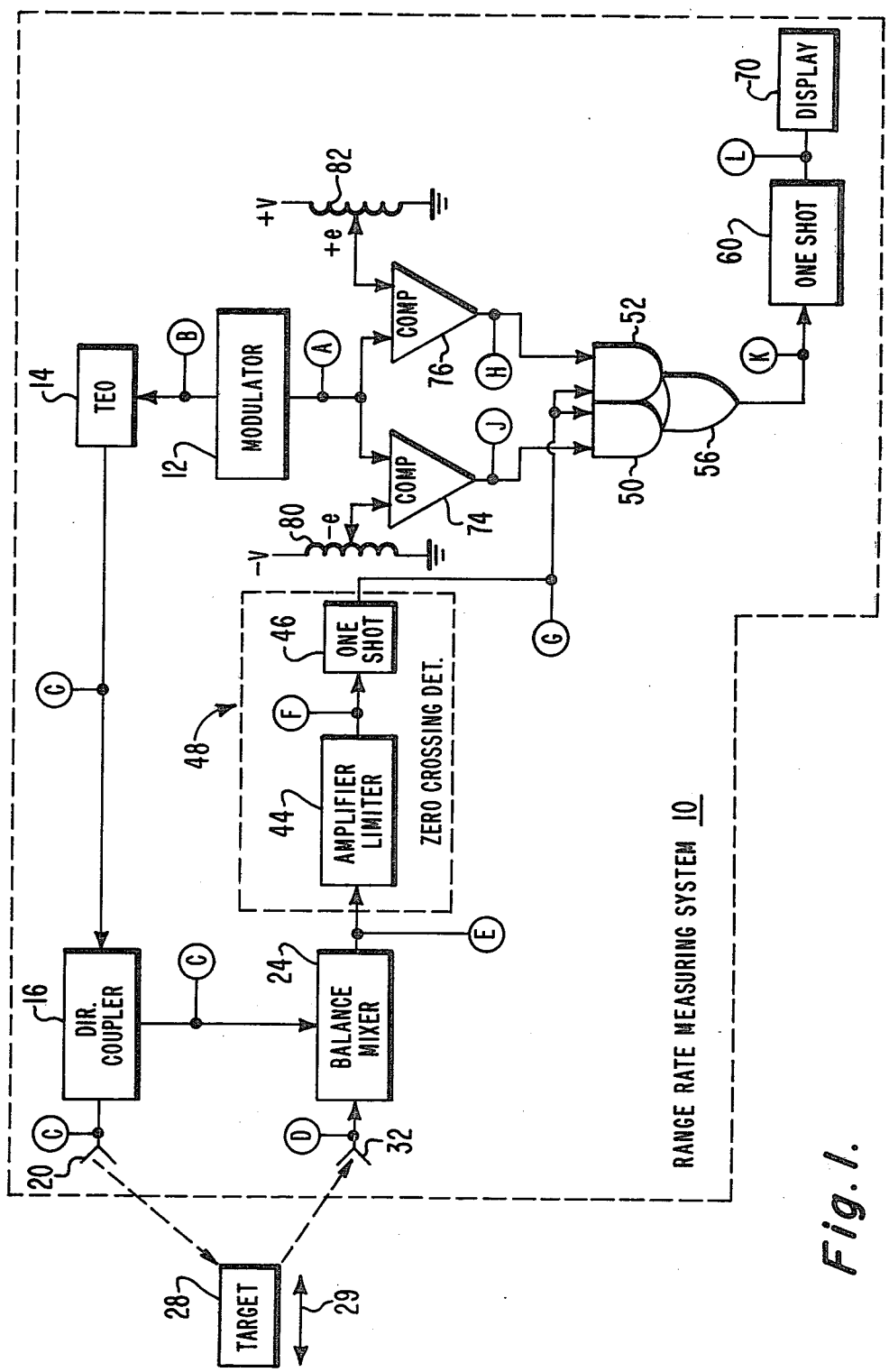
FIG. 1 is a range rate measuring system in block form in accordance with the present invention.
Figure 2:
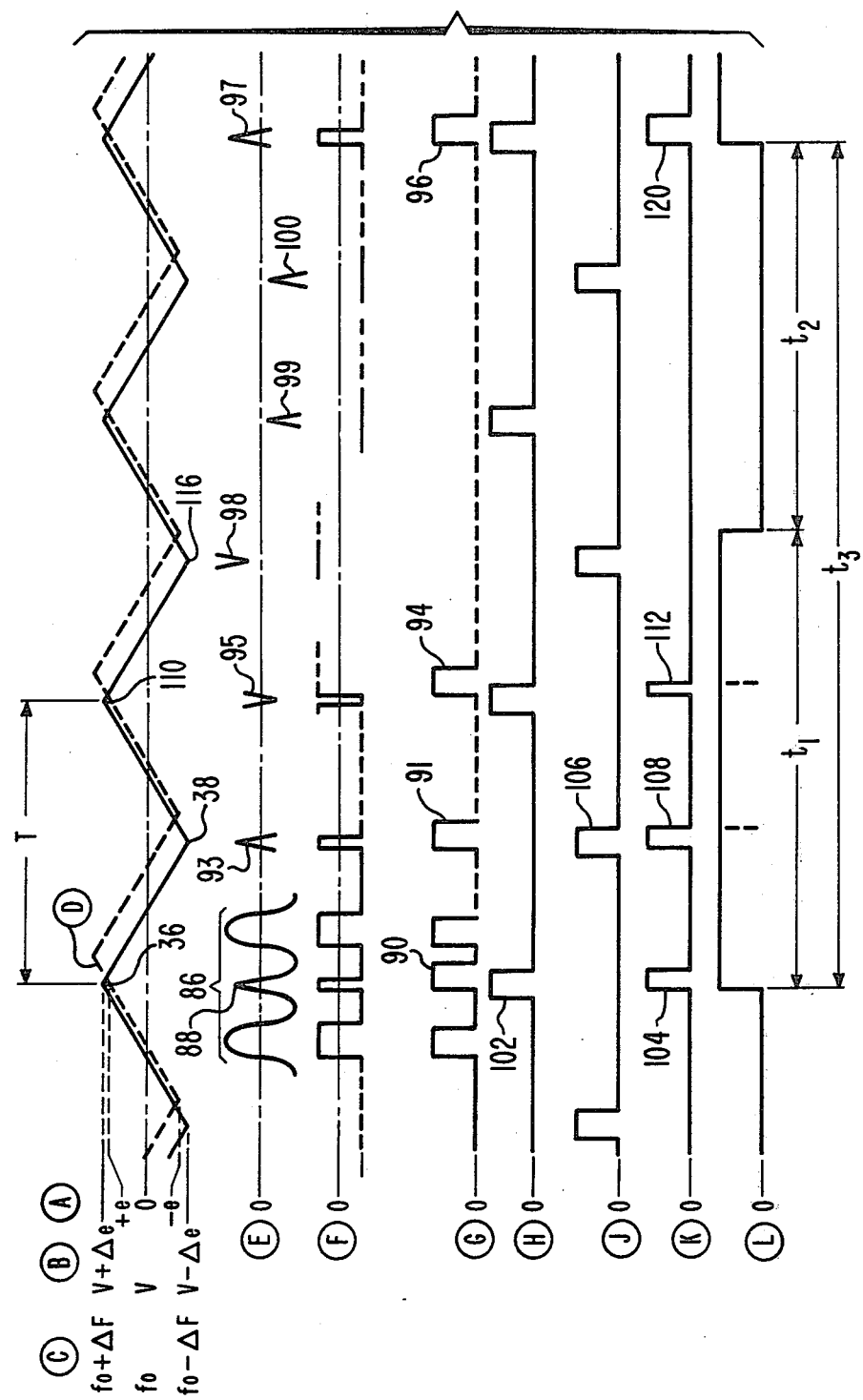
FIGS. 2A–2L are a set of waveforms keyed to various points in FIG. 1 and useful in understanding the operation of the system in FIG. 1.

Referring to FIG. 1, a range rate measuring system 10 includes a modulator 12 of conventional design, which is adapted to produce a triangular waveform as illustrated in FIG. 2, waveform A (hereinafter waveform 2A) and waveform 2B. Waveforms 2A and 2B are identical except for the value of the vertical axis. Waveform 2A extends above and below a zero value to a point somewhat greater than plus and minus e, respectively as will be described in more detail shortly.

Waveform 2B is symmetrical about some voltage, V, and extends above and below by $+\Delta e$ and $-\Delta e$ which bear no specific relationship to $\pm e$, respectively. Modulator 12 at terminal B is coupled to a voltage controlled oscillator such as a transferred electron oscillator 14 of conventional design which is adapted to operate at a given fundamental frequency, $f_0$, such as for example 10.575 GHz and to be frequency modulated in accordance with waveform 2B applied thereto thereby producing at terminal C a frequency modulated continuous wave (FMCW) signal.

The output waveform of TEO 14 as a function of frequency appears in waveform 2C. It will be noted that waveform 2C is identical to waveforms 2A and 2B except that the waveform is centered around frequency $f_0$ and rises to a frequency $f_0 \pm \Delta F$, where $\Delta F$ is the modulation frequency deviation and in one example is $\pm 25$ MHz.

TEO 14 at terminal C is coupled to an input terminal of directional coupler 16 and passed thereby to a radiating antenna 20 each of conventional design. A sample of the signal applied to directional coupler 16 by TEO 14 is passed by the directional coupler to a conventional balanced miser 24. The FMCW signal at antenna 20 is radiated thereby to a target of interest such as target 28.

The signal is reflected by target 28 to antenna 32 which is coupled to an input terminal of balanced mixer 24. Waveform 2D is identical in shape to waveform 2C and is displaced along the horizontal (time) axis in FIG. 2 by an amount which is proportional to the range of target 28 from range rate measuring system 10. If target 28 is stationary, with regard to measuring system 10, then waveform 2D is displaced in time (horizontally) by amounts dependent on range. If a target 28 is moving, such as for example, toward range measuring system 10, then waveform 2D is offset in frequency (vertically) as well as in time. This is the condition illustrated in waveform 2D relative to waveform 2C. It should be noted that the displacement of waveform 2D relative to waveform 2C is highly exaggerated. In practice the separation could not be seen in waveforms drawn to the scale of those in FIG. 2.

Balanced mixer 24 mixes waveforms it receives at terminals C to D to produce at terminal E the desired difference or beat frequency signal $f_B$. The beat frequency waveform is generally a sinusoidal waveform which has frequency components determinative of the range and range rate of target 28 from system 10 as described in the background section of the application. A typical beat frequent waveform produced at terminal E cannot accurately be depicted in the waveforms of FIG. 2. Waveform 2E attempts to picture only the portions of the waveform which occur at the modulation turnaround points of waveform 2C, such as at points 36 and 38.

The beat frequency signal is symmetrical about each modulation waveform turnaround point. An exemplary single cycle of the waveform on either side of turnaround point 36 is illustrated in waveform 2E and is highly exaggerated for purposes of illustration. In practice given the parameters of the system mentioned in the background section, as many as 70 or more complete cycles may be present between modulation changing points depending on the range of target 28 from system 10.

Balanced mixer 24 is coupled to an amplifier limiter 44 which amplifies signals received thereby at terminal E to saturation and then limits the signal to some preselected amount. Portions of the signal produced at terminal F by amplifier limiter 44, corresponding to the input signal at terminal E, are illustrated in waveform 2F. Amplifier limiter 44 is coupled to a one shot 46 which is of the non-retriggerable variety. One shot 46 upon receipt of a positively transitioning signal from limiter 44 will produce a pulse of fixed duration. The fixed duration is set to a time limit just slightly less than the period between adjacent cycles of beat frequency waveform 2E under conditions of maximum range. In an exemplary system in which the parameters are those given in the background section one shot 46 will be set to produce a pulse of duration slightly less than 1/200 KHz.

The system will function just as well if one shot 46 is adapted to sample negatively transitioning pulses from amplifier limiter 44 or to sample both positively and negatively transitioning pulses. In the latter instance, of course, one shot 46 would be set to produce a pulse of slightly less than one half the width of the pulse it produces were only negatively or positively transitioning pulses from amplifier limiter 44 are of concern. Amplifier limiter 44 and one shot 46 together act as a means 48 for detecting the crossings of the beat frequency signal from mixer 24 about its average value or some other predetermined value intermediate its upper and lower excursion limits. In appropriate applications single apparatus may be substituted for amplifier limiter 44 and one shot 46 to perform the above-mentioned crossing detection function.

The output terminal G of one shot 46 is coupled to an input terminal of each of AND gates 50 and 52. (This output is also used in the determination of range by a number of known methods, such as frequency counter or the technique described in the background section of the instant application). AND gates 50 and 52 are hard wired to an OR gate 56. The output terminal K of OR gate 56 is coupled to a one shot 60. One shot 60 is set to trigger upon receipt of a pulse at terminal K, to produce an output pulse, the duration of which is in excess of the duration of one half of a modulation cycle but less than the duration of a full modulation cycle. One shot 60, in contrast to one shot 46 is retriggerable such that if one shot 60 receives a pulse just prior to being reset, it will remain set again for a time duration in excess of the half modulation cycle time of waveforms 2A-D. One shot 60 is coupled to a suitable display means 70. Display 70 may, for example, take the form of a meter which in effect measures the frequency of the signal it receives from one shot 60 and displays the result on a velocity scale. As shown in waveform 2L, $t_3$ represents the time for the range to change in value by $\lambda/2$. As illustrated in the aforementioned textbook of D. G. C. Luck at FIG. IV-II (h), page 106, the indicated range between the measuring equipment 10 and target 28, as determined by counting cycles of beat frequency over an extended period of time and dividing by time, such as done by a frequency counter, will yield quantized values of range that alternately increase and decrease by one quantized value as the range of the target changes. This increase and decrease continues as the range changes until the true range between target 28 and equipment 10 has reached one extreme of indicated range. At that time, the number of counted cycles per unit of time, and therefore range alternately increases and decreases by one quantized value from the prior extreme value. For example, if the true range is between $R_1$ and $R_1 + \delta R$ (where $\delta R$ is the quantized range), the indicated values of range will alternate between $R_1$ and $R_1 + \delta R$ as the range changes. Assuming the target range is increasing, the value of range $R_1 + \delta R$ will be indicated an increasing proportion of the time while the value $R_1$ will be indicated a decreasing proportion of the time.

Referring again to waveform 2L $t_1$ represents the time duration of the indication of range $R_1 + \delta R$ while $t_2$ represents the time duration of the indication of range $R_1$. Time $t_3 = t_1 + t_2$ is the time required for a range change of target 28 relative to equipment 10 of $\lambda/2$ distance. The relative proportion $t_1/t_2$ is dependent on range. If the range is midway between the two allowed quantized levels (given by $t_1$ AND $t_2$) then $t_1$ is equal to $t_2$ and represents $\lambda/4$ change in range, in each case. As the range changes (for example increases toward $R_1 + \delta R$) then $t_1$ gets larger than $\delta/4$, simultaneously $t_2$ becomes smaller than $\Delta/4$. $\dot{R}$ is defined as $\Delta R/\Delta t$ as mentioned in the background section. As the carrier frequency is known, $\lambda$ is known. As $\lambda$ is known $\Delta R = \lambda/2$ is known. Therefore, $t_3 = \Delta t$ is the required unknown to solve for $\dot{R}$. If $t_3 = f_{\dot{R}}$ (frequency), $\dot{R}$ can be written as $\dot{R} = \lambda/2 \, f_{\dot{R}}$ as well as $\lambda/2t_3$. Thus, a measurement of f (times a constant, $\lambda/2$) gives $\dot{R}$.

Returning to modulator 12, terminal A thereof is coupled to respective inputs of comparators 74 and 76. Comparator 74 is coupled to a potentiometer 80 which is coupled to a source of potential $-V$. Potentiometer 80 is adjusted to provide potential $-e$ at comparator 74. Similarly comparator 76 is coupled to a potentiometer 82 which in turn receives potential from a suitable source $+V$. Potentiometer 82 is adjusted to provide potential $+e$ at comparator 76.

Referring for a moment to waveform 2A, it will be noted that $+e$ and $-e$ are adjusted to a point below and above, respectively, the extremities of the waveform. The comparators are adapted to produce priming pulses for their respective AND gates. Comparator 74 is adapted to produce a priming pulse at AND gate 50 when the potential applied to the comparator at terminal A is more negative than voltage $-e$. Similarly, comparator 76 is adapted to produce a priming pulse at AND gate 52 when the voltage applied to the comparator at terminal A is greater than $+e$. The $+e$ and $-e$ are adjusted such that the length of pulses applied to AND gates 50 and 52 are slightly less than the period of the maximum beat frequency expected in the system. In theory they could be adjusted substantially more narrow than that. However, if such is the case, noise in the system could cause sufficient timing error such that a desired output pulse at terminal G would not be coincident with the comparator output.

Operation of the circuit of FIG. 1 will now be given with reference, as appropriate, to the waveforms of FIG. 2.

TEO 14 produces a desired carrier frequency, such as for example, 10.575 GHz. The carrier signal is modulated by the signal produced by modulator 12 which in the example illustrated in FIG. 1 is a triangular wave having a period $T = \frac{1}{3}$ KHz. The frequency modulated continuous wave signal is passed to directional coupler 16 and thence to transmitting antenna 20. Directional coupler 16 passes a small fraction of the signal to balanced mixer 24. The signal radiated by antenna 20 will strike a target such as 28 in the vicinity of system 10. The FMCW signal is then reflected back to system 10 and strikes antenna 32.

In some applications, target 28 may contain a doubler which as is known to those skilled in the art, doubles the frequency of signals it receives but leaves them otherwise unaltered. In the case of a doubler being employed in target 28, a doubler is also employed between directional coupler 16 and balanced mixer 24. Otherwise operation is the same as that being described.

Balanced mixer 24 mixes signals it receives at terminals C and D. The resultant difference or beat frequency contains range and range rate information as is known to those skilled in the art. The signal produced at terminal E will be as illustrated in waveform 2E, the portion encompassed by bracket 86, that is, a generally sinusoidal waveform which has a discontinuity such as 88 at the turnaround point of modulation waveform 2C. As mentioned previously, for drawing clarity, the period of the sine wave in waveform E is greatly exaggerated over the typical situation. The waveform is also symmetrical about each modulation turnaround point such as turnaround point 36. The beat frequency produced by mixer 24 is amplified and limited by amplifier limiter 44 to produce a square wave as illustrated in waveform 2F. One shot 46, in accordance with the exemplary embodiment, is adapted to produce a positive pulse, the leading edge which corresponds with each positively transitioning portion of waveform 2F. As mentioned previously, one shot 46 could just as well be adapted to trigger on negatively transitioning portions of waveform 2F or on both positively and negatively transitioning portions of waveform 2F. Thus one shot 46 produces a pulse corresponding to each complete cycle of beat frequency waveform 2E. Additionally one shot 46 will produce a pulse at each modulation turnaround point where the beat frequency crosses the zero axis or its average value or other predetermined value. Thus, one shot 46 produces pulse 90 corresponding to waveform portion 88 of beat frequency waveform 2E, produces pulse 91 corresponding to waveform portion 93, produces pulse 94 corresponding to waveform portion 95 and produces pulse 96 corresponding to waveform portion 97. It will be noted that waveform portions 98, 99, and 100, occurring at modulation turnaround points do not cross the zero axis, therefore, one shot 46 does not produce any corresponding pulse.

During the time that the beat frequency is being produced, modulator 12 in combination with comparators 74 and 76 are producing priming or gating pulses at the respective AND gates 50 and 52, which are generally termed window pulses,. These pulses are centered about successive turnaround points of the waveform 2A, which is identical in shape to the modulation waveform 2C. Therefore, if a beat frequency waveform crosses its average value at a turnaround point, one of AND gates 50 and 52 will be enabled. Thus, for example, pulse 90 from one shot 46 enables AND gate 52 which is gated by window pulse 102. The resulting pulse 104 from OR gate 56 triggers one shot 60.

One shot 60 as described previously, remains in its triggered condition, slightly beyond the time of the next expected modulation turnaround point, 38 waveform 2A. Therefore, when one shot 46 produces pulse 91, waveform 2G, at the next turnaround point 38 in the modulation waveform, one shot 60 is still in its triggered condition. Pulse 91 enables AND gate 50 gated by pulse 106 thereby producing pulse 108 at OR gate 56 which retriggers one shot 60 insuring that it will remain set. Similarly during the next modulation turnaround point 110, pulse 112 from OR gate 56 again triggers one shot 60.

Shortly after the succeeding modulation turnaround point 116, one shot 60 becomes reset as no retriggering pulse from OR gate 56 is present. One shot 60 thereafter remains reset until the next triggering pulse 120 occurs corresponding to beat frequency waveform E portion 97 which crosses its average value. As mentioned in the background section, the presence and lack of presence rate of the beat frequency waveform portions at the modulation turnaround points is directly related to the range rate with which targets such as target 28 are moving relative to system 10. Therfore, with reference to waveform 2L, time $t_3$ extending from the beginning of the positively directed leading edge of one pulse from one shot 60 to the positively directed leading edge of the next succeeding pulse of one shot 60, is indicative of the range rate of target 28 since it is a measure of the rate of change of beat note frequency.

The technique just described for determining the velocity of target 28 gives the best performance of lower relative velocities when the number of samples in interval $t_3$ is relatively high. At relatively higher velocities, a point will be reached where beat frequency crossover will occur at every other turnaround point of the modulation waveform. In the exemplary system where the modulation rate is 3 KHz, the maximum velocity which can be determined is 76.5 kilometers per hour which is computed as follows.

In the exemplary embodiment, because a sample is taken at OR gate 56, every 166 microseconds ($\frac{1}{2}$ of $\frac{1}{3}$ KHz) and because a change in the number of crossovers of beat frequencies occurs every $\lambda/4$ of travel or 2.84 centimers divided by 4, the maximum measurable velocity is $2.84/4 \div (2 \times 166 \times 10^{-6})$ seconds or about 76.5 kilometers per hour. The factor of two appears in the denominator because it takes two consecutive samples to obtain one independent measurement in accordance with the known Nyquist criteria.

If it is desired to measure a higher velocity, this may be accomplished by increasing the frequency of the modulation rate to some number in excess of 3 KHz and/or decrease the carrier frequency below the value 10.575 GHz. A range rate of zero is a special case. Since the beat frequency is not changing with respect to time there either will be a crossover of beat frequency at each modulation turnaround point in which case one shot 60 remains continuously triggered, or no crossovers, in which case one shot 60 is untriggered.

At zero range rate, the time $t_3$ becomes infinite (due to either $t_1$ or $t_2$ being infinite) and therefore the correct value for $\dot{R}$ is obtained ($\lambda/\infty = 0$).

The formula for determining range rate given the signal produced by one shot 60 is as follows:

Since the time $t_3$, of waveform 2L corresponds to a change in range of $\lambda/2$ ($\sim\lambda/4$ for $t_1$ and $\sim\lambda/4$ for $t_2$), the range rate, $\dot{R}$, is determined by dividing distance ($\lambda/2$) by time $t_3$ to give $\dot{R} = \lambda/2t_3$. If $\lambda$ is measured in KM and t in hours $\dot{R}$ will be in KM/HR.

What is claimed is:

1. Apparatus for determining the range rate of a target relative to said apparatus comprising in combination:
    means for producing and radiating a frequency modulated continuous wave (FMCW) signal of known modulation pattern and carrier frequency which signal strikes said target;
    means for receiving a reflected signal from said target;
    means responsive to said radiated signal and said reflected signal for producing a beat frequency signal thereof;
    concurrence means producing a pulse indicative of each concurrent presence of a turnaround point of said FMCW signal and a crossing of said beat frequency signal about a preselected value thereof;
    means responsive to said concurrence means pulses for producing a signal corresponding to the rate, as a function of time, of the presence and absence of said crossing at said turnaround points;
    means responsive to said beat frequency signal for producing a pulse corresponding to each crossing in one sense of the beat frequency signal about said preselected value, said pulses therefrom being applied to said concurrence means; and
    means responsive to said beat frequency signal for producing a square wave signal, changes of the value of which correspond to the crossings of the beat frequency signal about said preselected value, said means producing pulses corresponding to each crossing being responsive to said square wave signal.

2. The combination as set forth in claim 1 including means responsive to each turnaround point of said FMCW signal for producing a pulse corresponding thereto, said pulses produced thereby being applied to said concurrence means.

3. The combination as set forth in claim 2 further including means for adjusting the width of said pulses corresponding to said turnaround points.

4. Apparatus for determining the range rate of a target relative to said apparatus comprising in combination:
    means for producing and radiating a frequency modulated continuous wave (FMCW) signal of known modulation pattern and carrier frequency which signal strikes said target;
    means for receiving a reflected signal from said target;
    means responsive to said radiated signal and said reflected signal for producing a beat frequency signal thereof;
    concurrence means producing a pulse indicative of each concurrent presence of a turnaround point of said FMCW signal and a crossing of said beat frequency signal about a preselected value thereof;
    means responsive to said concurrence means pulses for producing a signal corresponding to the rate, as a function of time, of the presence and absence of said crossings at said turnaround points; and
    means responsive to said beat frequency signal for producing a pulse corresponding to each crossing in one sense of the beat frequency signal about said preselected value, said pulses being of shorter duration than the period of the beat frequency associated with the maximum range of interest of said target, said pulses therefrom being applied to said concurrence means.

5. Apparatus for determining the range rate of a target relative to said apparatus comprising in combination:

means for producing and radiating a frequency modulated continuous wave (FMCW) signal of known modulation pattern and carrier frequency which signal strikes said target;

means for receiving a reflected signal from said target;

means responsive to said radiated signal and said reflected signal for producing a beat frequency signal thereof;

concurrence means producing a pulse indicative of each concurrent presence of a turnaround point of said FMCW signal and a crossing of said beat frequency signal about a preselected value thereof;

means responsive to said concurrence means pulses for producing a signal corresponding to the rate, as a function of time, of the presence and absence of said crossings at said turnaround points; and means responsive to each said correspondence means signal for producing a pulse of length in excess of one half the modulation period of said FMCW signal.

* * * * *